(12) United States Patent
Laurent et al.

(10) Patent No.: US 9,787,801 B2
(45) Date of Patent: Oct. 10, 2017

(54) DATA TRANSMISSION USING A MULTIHOMING PROTOCOL AS SCTP

(71) Applicant: THOMSON LICENSING, Issy de Moulineaux (FR)

(72) Inventors: Anthony Laurent, Vignoc (FR); Stephane Gouache, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 431 days.

(21) Appl. No.: 13/908,155

(22) Filed: Jun. 3, 2013

(65) Prior Publication Data
US 2013/0325933 A1    Dec. 5, 2013

(30) Foreign Application Priority Data

Jun. 4, 2012 (EP) .................... 12305623

(51) Int. Cl.
*H04L 29/06* (2006.01)
*H04L 29/08* (2006.01)
*H04L 12/54* (2013.01)
*H04L 12/46* (2006.01)
(Continued)

(52) U.S. Cl.
CPC ............. *H04L 67/42* (2013.01); *H04L 69/14* (2013.01); *H04L 69/326* (2013.01); *H04L 12/4633* (2013.01); *H04L 12/5695* (2013.01); *H04L 45/02* (2013.01); *H04L 45/20* (2013.01)

(58) Field of Classification Search
CPC ..... H04L 41/0896; H04L 47/10; H04L 47/12; H04L 47/125; H04L 47/41; H04L 43/0882; H04L 12/2062; H04L 12/5632
See application file for complete search history.

(56) References Cited

U.S. PATENT DOCUMENTS

| 5,818,845 A | 10/1998 | Moura et al. |
| 6,882,627 B2 | 4/2005 | Pieda et al. |
| 7,512,409 B1 | 3/2009 | Hadad |

(Continued)

FOREIGN PATENT DOCUMENTS

| EP | 2685664 A1 | 1/2014 |
| WO | 2011/071474 A1 | 6/2011 |

OTHER PUBLICATIONS

Ford et al: TCP Extensions for Multipath Operation with Multiple Addresses: Internet Engineering Task Force, Mar. 9, 2010.

(Continued)

*Primary Examiner* — Barbara Burgess
(74) *Attorney, Agent, or Firm* — Myers Wolin LLC

(57) ABSTRACT

Method of transmission of data between a server and a client, said transmission using a multihoming protocol, as SCTP, over a network comprising at least one principal link and one secondary link connecting the server and the client, said method comprising the steps of:
  a) set-up of a connection between the server and the client;
  b) allocation of a bandwidth over the principal link to the transmission of data from the server to the client;
  c) transmission of data from the server to the client over the principal link as long as said allocated bandwidth is not fully used; and
  d) if the allocated bandwidth has been fully used, transmission of data from the server to the client over the secondary link.

20 Claims, 2 Drawing Sheets

(51) Int. Cl.
*H04L 12/751* (2013.01)
*H04L 12/733* (2013.01)

(56) References Cited

U.S. PATENT DOCUMENTS

| | | | |
|---|---|---|---|
| 8,055,211 B2 | 11/2011 | Chance et al. | |
| 2004/0136379 A1* | 7/2004 | Liao | H04L 12/5695 370/395.21 |
| 2004/0218540 A1* | 11/2004 | Foschiano | H04L 45/02 370/241 |
| 2004/0243670 A1 | 12/2004 | Grimminger et al. | |
| 2006/0120395 A1* | 6/2006 | Xing | H04B 7/0613 370/431 |
| 2006/0193295 A1 | 8/2006 | White et al. | |
| 2007/0233897 A1* | 10/2007 | Craft | H04L 29/12377 709/238 |
| 2007/0242675 A1* | 10/2007 | Romrell | H04L 12/4633 370/395.4 |
| 2008/0084819 A1* | 4/2008 | Parizhsky | H04L 47/10 370/230 |
| 2009/0003831 A1 | 1/2009 | Zheng | |
| 2009/0201886 A1 | 8/2009 | Lee et al. | |
| 2010/0091669 A1* | 4/2010 | Liu | H04L 45/20 370/252 |
| 2011/0296006 A1 | 12/2011 | Drishnaswamy et al. | |

OTHER PUBLICATIONS

Search Report Dated Aug. 9, 2012.

Boussen et al., "Performance analysis of SCTP protocol in WiFi network", 2009 Fourth International Conference on Computer Sciences and Convergence Information Technology, DOI 10.1109/ICCIT.2009.30, IEEE Copyright 2009, pp. 178-182.

Darche et al., "Using SCTP to improve performances of hybrid broadcast/telecommunication network system", IEEE CCNC 2006 proceedings, IEEE Copyright 2006, pp. 371-375.

DeMarco et al., "Performance Analysis of IP Micro-mobility Protocols in Single and Simultaneous Movements Scenario", T. Enokido et al. (Eds.): EUC Workshops 2005, LNCS 3823, 2005, pp. 443-451.

Gurtov et al., "Secure Multipath Transport for Legacy Internet Applications", http://eudl.eu/pdf/10.4108/ICST.BROADNETS2009.7186 , 2009.

Joe et al., "SCTP Throughput Improvement with Best Load Sharing based on Multihoming" 2009 Fifth International Joint Conference on INC, IMS and IDC, DOI 10.1109/NCM.2009.170, IEEE Copyright 2009, pp. 138-142.

Liu et al., "Exploiting Multi-link SCTP for Live TV Broadcasting Service", 978-1-4244-2519-8/10/$26.00 IEEE Copyright 2010.

Stewart, "Stream Control Transmission Protocol", Sep. 2007.

Stewart et al., "Stream Control Transmission Protocol (SCTP) Dynamic Address Reconfiguration", Sep. 2007.

Terpstra et al., "Channel-based Unidirectional Stream Protocol (CUSP)", IEEE INFOCOM 2010 proceedings, 978-1-4244-5837-0/10/$26.00 IEEE Copyright 2010.

Deering et al., "Internet Protocol, Version 6 (IPv6) Specification", RFC 2460, Network Working Group, Cisco Systems, Inc., San Jose, CA; Nokia, Sunnyvale, CA, The Internet Society, Dec. 1998, pp. 1-35.

* cited by examiner

DATA TRANSMISSION USING A MULTIHOMING PROTOCOL AS SCTP

This application claims the benefit, under 35 U.S.C. §119 of European Patent Application 12305623.6, filed Jun. 4, 2012.

FIELD OF THE INVENTION

The present invention generally relates to the field of transport layer protocols used for transporting information within a network.

More particularly, the invention deals with the multihoming protocols, such as the Stream Control Transport Protocol, known as SCTP, which is standardized by the Internet Engineering Task Force (IETF) in IETF RFC 4960.

Thus, the invention concerns a method, a server, and a client for the transmission of data using a multihoming protocol. It also concerns a computer program implementing the method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Stream Control Transmission Protocol (SCTP) is a general-purpose transport layer protocol providing a service similar to TCP (Transmission Control Protocol) plus a set of advanced features to use the enhanced capabilities of modern IP (Internet Protocol) networks and to support increased application requirements. Nowadays, there are SCTP implementations for all major operating systems.

The SCTP protocol, as specified by the IETF, is used in 3GPP (3rd Generation Partnership Project) for transporting signaling information within a cellular core network. SCTP was designed to address certain limitations inherent to TCP for the transport of signaling for telephony over IP. One of the main design goals of SCTP was the efficient transport of small messages in a network fault-tolerant way, important for transporting signaling messages. Thus, SCTP provides a reliable data transmission service for the transport of service messages to applications users.

SCTP is a connection-oriented general-purpose transport protocol that preserves message boundaries. An SCTP connection, called an SCTP association, can be used on top of IPv4 and IPv6.

The messages are encapsulated in data structures called chunks. The chunks are themselves encapsulated in SCTP packets. Moreover, SCTP incorporates several new features that are not available in TCP.

One of the most important enhancements provided by SCTP over traditional transport layer protocols is multihoming. This multihoming feature allows an SCTP association to use several source and destination addresses. Then, each node can be accessed by several addresses set at the establishment of the association. The addresses of transport are exchanged during the initialization of an SCTP association.

The multihoming feature was used up to now as a way to provide reliability. Whenever a primary path between a source and a destination fails, the SCTP association remains as a traffic can continue to flow over one of the secondary paths.

An SCTP association requires to have a bidirectional link for exchanges between two end-points. That's why, up-to-now, the various paths used in a SCTP session were generally bidirectional links.

In another context, unidirectional links are used, for instance broadcast networks, to deliver not only a broadcast or a multicast content but also a specific content destined to only one client, as a VoD (Video on Demand) content for instance. This is made possible thanks to such unidirectional networks topology which is similar to a tree as depicted in FIG. 1.

The topology represented in FIG. 1 contains one node 2 connected to a headend router 4 via a multiplexer 6. Three southbound trunks 8 are provided with a given number of clients 10 attached to each southbound trunk 8.

Thus, within this topology, there is not a unique and identical multiplex delivered to all the clients, this multiplex containing all the available broadcast content. Here, on each southbound trunk 8, a multiplex 12 is provided, that contains only the content requested by the clients 10 of the same trunk, and is not burdened with traffic that is useless for its clients 10. That's why, with this topology, some bandwidth is freed and can be used for other purposes, as delivering an individual, i.e. unicast, content.

Moreover, a broadcast network is managed so that a constant quantity of bandwidth can be allocated to a given content, which guarantees a given quality of service.

It is also known that cable TV operators' networks are called hybrid fiber-coaxial (HFC) since they combine optical fiber and coaxial cable, i.e. a unidirectional link and a bidirectional one. For a cable operator, it costs much more to deliver data over the broadband network than over the broadcast network. That's why the cable operators attempt to privilege this last broadcast link.

A broadcast network is a unidirectional network. It can be completed with a broadband network to provide a return channel but the synergy between both networks does not allow to leverage all existing delivery technologies to deliver content, especially an IP-based huge content, in an efficient way. For instance, existing broadcast networks and transport protocols do not allow to deliver a video content to a client using HTTP, or any other protocols on top of TCP. This means that an operator cannot complement its broadband network with the broadcast one to deliver video content using an HTTP streaming.

A protocol called UDLR (UniDirectional Link Routing) aims at emulating bidirectional capability for a unidirectional link by associating it with a bidirectional link and tunneling the uplink data through the bidirectional link. This solution however lacks bandwidth aggregation capability.

The paper "Using SCTP to improve performances of hybrid broadcast/telecommunication network system", IEEE Consumer Communications and Networking Conference, 11-13 Jan. 2007, presents a network architecture based on the coupling of a GPRS (Generalized Packet Radio Services) up-link with a DVB-T (Digital Video Broadcasting-Terrestrial) downlink using the SCTP protocol.

Thus, this prior art paper uses a unidirectional network for the down-link and a bidirectional network for the uplink. Such architecture assumes that there is always an available bandwidth on the unidirectional, i.e. broadcast, network. However, such availability of the bandwidth cannot be guaranteed in practice.

SUMMARY OF THE INVENTION

The present invention proposes a solution for improving the situation.

Accordingly, the present invention provides a method of transmission of data between a server and a client, said transmission using a multihoming protocol over a network comprising at least one principal link and one secondary link connecting the server and the client, said method comprising the steps of:

a) set-up of a connection between the server and the client;
b) allocation of a bandwidth over the principal link to the transmission of data from the server to the client;
c) transmission of data from the server to the client over the principal link as long as said allocated bandwidth is not fully used; and
d) if the allocated bandwidth has been fully used, transmission of data from the server to the client over the secondary link.

Preferably, the multihoming protocol is the Stream Control Transmission Protocol, SCTP, or an extension of SCTP.

In this case, the connection set-up between the server and the client is an SCTP association.

Examples of extensions of SCTP are SCTP with Partial Reliability (SCTP-PR), Westwood SCTP (W-SCTP), and W-SCTP-PR.

Advantageously, the principal link is a unidirectional link and the secondary link is a unidirectional or a bidirectional link.

Preferably, the unidirectional link is a broadcast link and the bidirectional link is a broadband link.

As an example, a bandwidth is allocated in a transport stream, known as an MPEG2-TS, to deliver a personal IP-based content to the client. In the case where the client requests video content over HTTP, the server will deliver IP-based traffic over the transport stream, the supplementary traffic, according to the available bandwidth, being delivered over the broadband link.

This allows a broadcast, for example a cable, operator to deliver personal, i.e. unicast, content to a client through the broadcast network in an aggregate fashion as if it was using a single, larger bandwidth bidirectional link. In other words, the operator transparently complements his broadband network with the broadcast one for use with bidirectional applications.

By providing the possibility to create and use SCTP sessions with a unidirectional link to deliver personal, i.e. unicast, data from the server to the client and a bidirectional link to deliver the data that cannot be delivered over the unidirectional link due to a lack of reserved bandwidth, the method of the present invention provides a solution to incorporate a guaranteed quality unidirectional link within a SCTP session.

Thus, the present invention improves SCTP to favor the content delivery over the unidirectional link according to the allocated bandwidth, the bidirectional link being used only to deliver a supplementary traffic. As an example, considering that 3 Mbit/s are reserved for a SCTP session over the unidirectional link, if the data bandwidth is 4 Mbit/s, then the unidirectional link will be fully filled and 1 Mbit/s will be delivered over the bidirectional link.

Advantageously, the step of set-up of a connection comprises an exchange of characteristics of each interface between each of the server and the client and each link, said characteristics comprising, for each interface, at least:

a flag indicating the nature of the interface, said nature being chosen amongst bidirectional, send-only and receive-only;
a guaranteed bandwidth through the interface.

In the case of SCTP, the exchange of these characteristics permits to complement SCTP to allow the creation of a SCTP session comprising at least the principal link, particularly a unidirectional link.

Preferably, the characteristics of the interface are incorporated in a control message, for example a control chunk called the INIT chunk.

Thus, according to this embodiment, in the case of SCTP, the existing SCTP control messages are modified by adding at least flag and bandwidth fields in the INIT chunks.

Advantageously, said characteristics comprise, for each interface, a delay for the transmission of data through the interface.

According to an exemplary embodiment, the flag is encoded over 4 bits, the bandwidth is encoded over 28 bits and the delay is encoded over 16 bits.

According to one embodiment, the step of allocation of the bandwidth is carried before the step of set-up of a connection.

This permits a configuration of the server once for all in a static way. More particularly, a bandwidth is reserved for each client over a unidirectional link, even if said bandwidth is not used. Then, when a client initiates a SCTP session, all resources on the unidirectional link are already reserved.

According to another embodiment, the step of allocation of the bandwidth is carried after the step of set-up of a connection.

Preferably, in this case, the allocated bandwidth is freed when the connection, as a SCTP session, is ended.

Advantageously, the data comprising delay sensitive packets and non delay sensitive packets, the delay sensitive packets are transmitted first and the non delay sensitive packets are then transmitted over the remaining bandwidth in the principal link and/or the secondary link.

This permits to efficiently dispatch the packets on both the principal and secondary links while ensuring a minimum delay transmission.

Thus, the present invention introduces a modification of the SCTP transport protocol making it able to leverage unidirectional links. The modification is introduced in the control chunks and in the packet scheduling function that selects the link over which the packets should be sent in order to take advantage of unidirectional links.

The invention further provides a server able to transmit data to a client using a multihoming protocol over a network comprising at least one principal link and one secondary link connecting the server and the client, said server comprising:

a) a link management module able to set-up a connection between the server and the client;
b) a transport manager able to allocate a bandwidth over the principal link to the transmission of data from the server to the client;
c) a first transmitter for the transmission of data from the server to the client over the principal link as long as said allocated bandwidth is not fully used; and
d) a second transmitter for the transmission of data from the server to the client over the secondary link if the allocated bandwidth has been fully used.

Preferably, the multihoming protocol is SCTP.

Advantageously, the principal link is a unidirectional link and the secondary link is a unidirectional or a bidirectional link.

The unidirectional link may be a broadcast link. In this case, the transport manager is a transport stream manager.

Advantageously, the link management module is able to provide to the client at least, for each interface between the server and each link, a flag indicating the nature of the interface amongst bidirectional and send-only, and a guaranteed bandwidth through the interface.

In the case of SCTP, the link management module is integrated in the SCTP transport protocol to leverage unidirectional paths.

According to an embodiment, the transport manager is an IP encapsulator.

The invention also provides a client able to receive data from a server using a multihoming protocol over a network comprising at least one principal link and one secondary link connecting the server and the client, said client being able to initiate a connection with the server and to provide to said server at least a flag indicating the nature of each interface between the client and each link, said nature being chosen amongst bidirectional and receive-only.

The method according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The invention thus provides a computer-readable program comprising computer-executable instructions to enable a computer to perform the method of the invention. The flowchart of FIG. 7 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
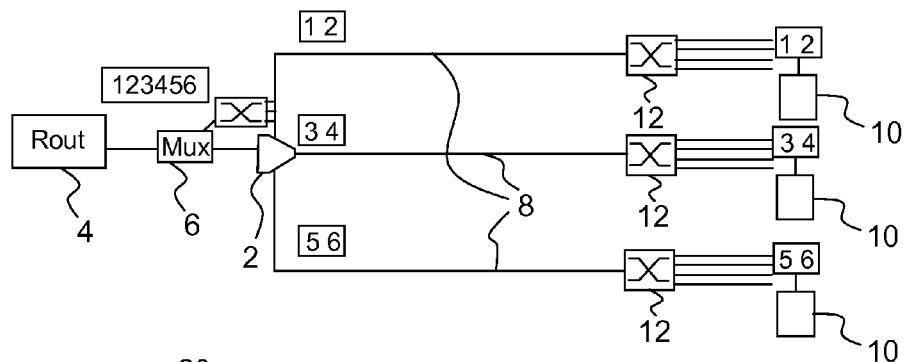
FIG. 1, already described, is a schematic view of a broadcast network topology according to the prior art.
Figure 2:
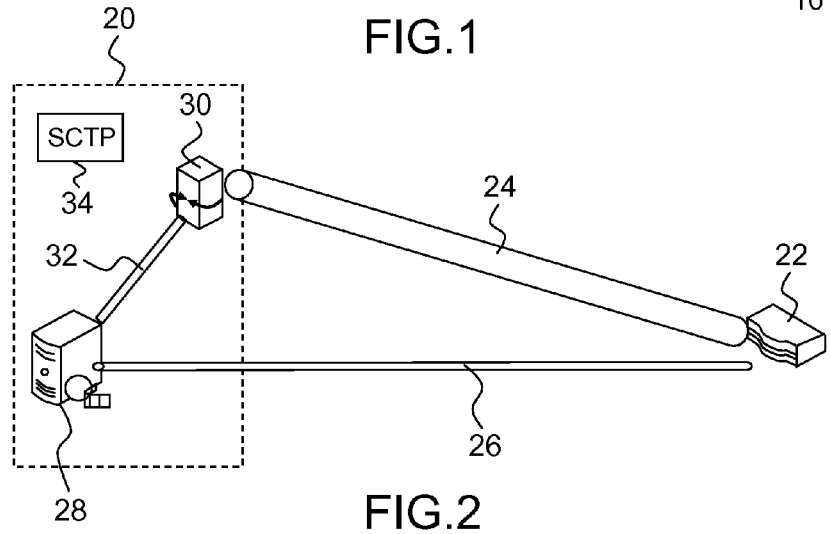
FIG. 2 is a schematic view of an embodiment of a network architecture between a server and a client according to an embodiment of the present invention.
Figure 3:
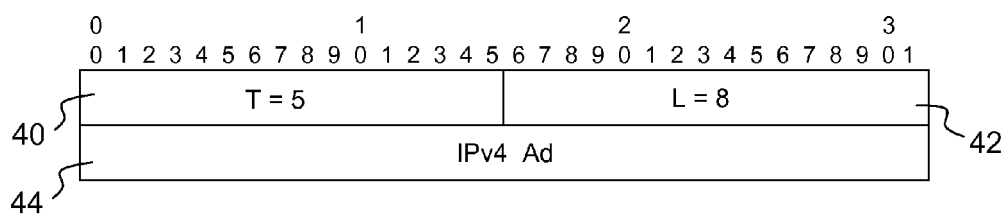
FIG. 3 is a first example of a part of a SCTP control message according to the prior art.
Figure 4:
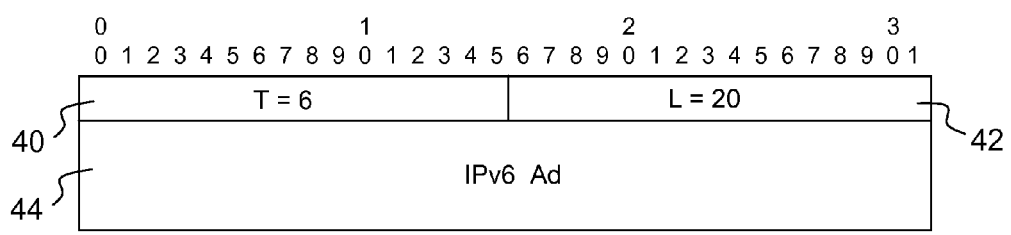
FIG. 4 is a second example of a part of a SCTP control message according to the prior art.

Referring to FIG. 2, there is shown therein a schematic view of a network architecture between a server 20 and a client 22 according to a preferred embodiment of the invention.

The considered network architecture is a hybrid architecture comprising a unidirectional link 24, which is here a broadcast link from the server 20 to the client 22, and a bidirectional link 26, which is here a broadband link.

The server 20 comprises a content server 28 and a transport stream manager 30.

Preferably, the content server 28 and the transport stream manager 30 are two separate equipments connected by a bidirectional management link 32.

As well-known in the art, the broadcast link 24 is made up of several transport streams, each of them being delivered at a different frequency. A transport stream delivers several services. It encapsulates packetized data streams. Each piece of data in a transport stream is identified by a 13-bit packet identifier, named PID.

The transport stream manager 30 is the equipment in charge of managing the organization and the generation of the various transport streams composing the unidirectional link 24.

Preferably, the transport stream manager 30 is an IP Encapsulator.

The client 22 is, for example, a home gateway located in a home network of a user.

Besides, the server 20 comprises a link management module 34 able to set-up an SCTP association with the client 22 and able to leverage the unidirectional link 24.

In order to allow the use of SCTP sessions with a path over the unidirectional link 24, the present invention proposes to modify existing SCTP control messages. The proposed modifications are described in the following with reference to FIGS. 3 to 6.

In SCTP, when an association is setup between two endpoints as the server 20 and the client 22, the initiator of the session, for example the client 22 here, sends a list of addresses that it wishes to use for the association as part of a control message, known as a control chunk, called the INIT chunk. Then, any subsequent adding of an interface is made using a chunk, named ASCONF chunk which uses the same format to represent addresses.

The peer, for example the server 20 here, receiving this indication responds with its own local addresses it wishes to be used for the association. The addresses are exchanged as a Type Length Value (TLV) data structure presented in RFC 4960 and shown on FIG. 3 for IPv4 and on FIG. 4 for IPv6. Thus, this data structure of the address comprises three fields: a type field 40, a length field 42 and a value field 44.

As already known in the art, the type field 40 is an alphanumeric code indicating the kind of field that this part of the control message represents. For the IPv4 case, this code is equal to 5 whereas for the IPv6 case, it is equal to 6.

The length field 42 indicates the size of the value field. For the IPv4 case, this size is equal to 8 whereas for the IPv6 case, it is equal to 20.

The value field 44 contains the address of the sending endpoint. It is an unsigned integer binary encoded over 32 bits for the IPv4 case and over 128 bits for the IPv6 case.

Figure 5:
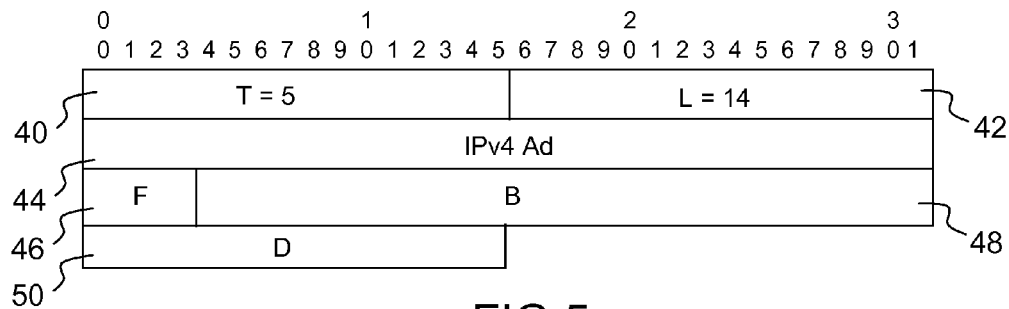
FIG. 5 represents a modification of the first example of FIG. 3 according to an embodiment of the present invention.
Figure 6:
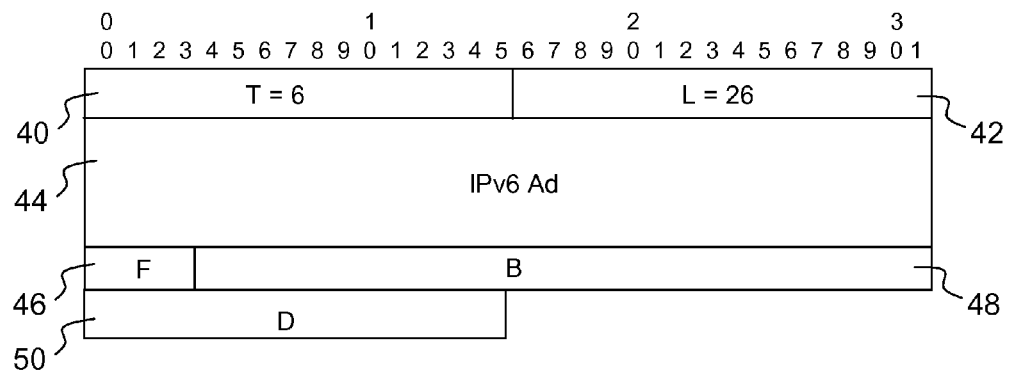
FIG. 6 represents a modification of the second example of FIG. 4 according to an embodiment of the present invention.

As shown on FIGS. 5 and 6, according to an embodiment of the present invention, three fields are added: a flag field 46, a bandwidth field 48 and a delay field 50.

The flag field 46 indicates the nature of the interface between the considered endpoint and the considered link for the SCTP session. Advantageously, it is an unsigned integer encoded over 4 bits. As an example, the flag field 46 may take the following values:

"0000" indicating that the interface is bidirectional;
"1000" indicating that the interface is send-only, i.e. it cannot receive;
"0100" indicating that the interface is receive-only, i.e. it cannot send.

Other values of the flag field are advantageously reserved for a future use.

The bandwidth field 48 contains a value of a guaranteed sustainable bandwidth over the interface. It is expressed, for instance, in kilobits per second. Advantageously, it is an unsigned integer encoded over 28 bits. A zero value of this field may preferably mean that the interface has no guaranteed bandwidth.

The delay field 50 contains a delay for bits sent through the interface. It is expressed, for instance, in milliseconds. Advantageously, it is an unsigned integer encoded over 16 bits. A zero value of this field may preferably mean that the delay of the interface is unknown.

As expected, due to the addition of the fields 46, 48, 50, the length field 42 is modified accordingly. Thus, in the case of IPv4, it takes the value 14 and in the case of IPv6, it takes the value 26.

Figure 7:
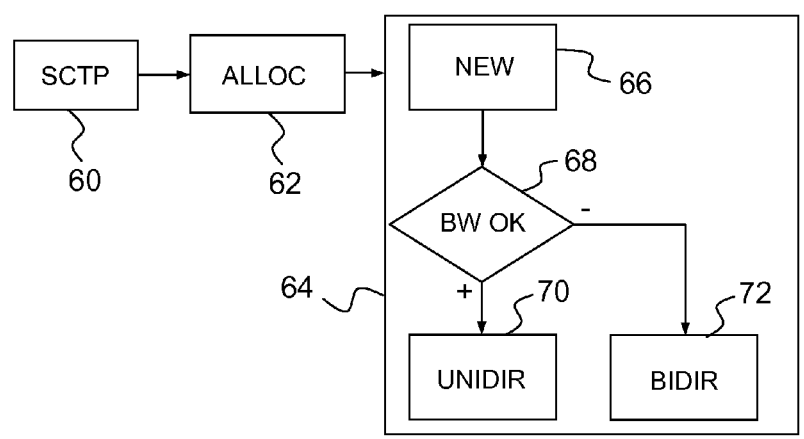
FIG. 7 is a flowchart illustrating the steps of an embodiment of the method of transmission of the invention.

The flowchart of FIG. 7 details the steps of the method of the invention for transmitting data, in the form of an IP traffic, according to a preferred embodiment.

At step 60, an SCTP association is set-up between the server 20 and the client 22. For this, the client 22 initiates the SCTP association with the server 20 by signaling the availability of its receive-only interface. The server 20, using its link management module 34, responds by indicating the IP address of its send-only interface, capable of transmitting, for example 3 Mbps, but unable to receive any uplink traffic from the client 22. Thus, both endpoints, i.e. the server 20 and the client 22, know the capabilities of their peer's addresses and associated unidirectional interfaces.

At step 62, the transport stream manager allocates a bandwidth over the unidirectional link 24 to the transmission of data from the server 20 to the client 22. Three variants may be implemented for this allocation.

According to a first variant, the step 62 is carried before the step 60. Indeed, in this case, the content server 28 is configured once for all in a static way and knows the IP address bound to the unidirectional link 24. The content server 28 transmits this information to the transport stream manager 30. This last allocates a given bandwidth for the client 22 and updates its signaling according to this allocation by associating a PID identifier and the IP address in a dedicated table. Thus, in this variant, the bandwidth is reserved even if not used. Then, the transport stream manager 30 informs the content server 28 about the allocated bandwidth for the client 22.

When the client 22 initiates the SCTP session at step 60, all resources on the unidirectional link 24 have been already reserved. The client 22 knows the transport streams parameters, e.g. the PID and the frequency, to retrieve thanks to the information provided in the signaling present in the transport stream signaling and transmitted from the transport stream manager 30 through the unidirectional link 24.

According to a second variant, the step 62 is carried after the step 60. In this case, no resource is allocated for the client 22 in advance on the unidirectional link 24. When the client 22 initiates a SCTP session at step 60, the content server 28 contacts the transport stream manager 30 and requests for a given bandwidth. The transport stream manager 30 allocates a bandwidth that may differ from the requested one, i.e. which may be narrower than the requested bandwidth if there is not enough available bandwidth, and then informs the content server 28 about the allocated bandwidth.

The transport stream manager 30 also updates the broadcast signaling to allow the client 22 to retrieve the PID containing the IP traffic.

The third variant is quite similar to the second variant except that the information about the transport stream parameters is not transmitted through a broadcast signaling but in a packet transmitted over the broadband link 26 by the content server 28. In this case, the transport stream manager 30 does not need to update the signaling since the signaling information concerning unicast IP traffic is delivered over the broadband link 26.

The content server 28 forwards the transport stream parameters to the client 22 to allow it to retrieve the PID containing the IP traffic. These parameters are attached to an ASCONF message, as defined in RFC 5061, as an opaque binary parameter. The SCTP protocol stack of the client 22 must then pass these parameters to a non represented adapter connected to the unidirectional link 24. Once the adapter is properly configured and able to receive the data via the unidirectional link 24, the client 22 acknowledges the reception of the parameters with an ASCONF ACK message.

In the three variants above, the allocated bandwidth may advantageously be dynamic. In this case, each time the bandwidth changes, the transport stream manager 30 informs the link management module 34 about the change, particularly by using ASCONF messages. For instance, an ASCONF-DELETE_IP_ADDRESS chunk followed by an ASCONF-ADD_IP_ADDRESS containing the new bandwidth may be transmitted.

At step 64, data in the form of IP packets is transmitted from the server 20 to the client 22 according to the following description.

This transmission comprises the implementation of a scheduling algorithm for scheduling the packets to be sent from the server 20 to the client 22 over the unidirectional link 24 and the bidirectional link 26.

For this, a preferred embodiment of the invention modifies existing multipath scheduling algorithms specifically in the context of the Westwood SCTP protocol, generally noted W-SCTP.

The first scheduling algorithm considered here is similar to a weighted round-robin scheme and is thus appropriate for large data transfers, whereas the second scheduling algorithm aims at minimizing the transmission delay and is appropriate for delay-sensitive traffic.

In any case, an estimate $R_i$ for the reception time over a link i is computed for each data packet and the link having the lowest estimate $R_i$ is used to transmit said packet.

In W-SCTP, the scheduler algorithm uses the formula (1):

$$R_i = (O_i + D)/B \tag{1}$$

in which:
- $R_i$ is the estimated reception time for the link i;
- $O_i$ is a current amount of outstanding, i.e. unacknowledged, data on the link i;
- D is an amount of data to be sent;
- $B_i$ is a current estimate of the link's capacity.

This algorithm basically gives priority to the less busy link while attempting to balance the load, i.e. more data will be sent over the link having the greatest bandwidth as long as the amount of unacknowledged data remains small.

In one embodiment of the present invention, this algorithm is modified so as to fill the capacity of the unidirectional link 24 first and then distribute the remainder of the traffic on the bidirectional link 26.

Firstly, unidirectional links, here the link 24, are identified. By using the invention, this identification is easy as such unidirectional links have a send-only address connected to a receive-only address.

Besides, the characteristics, namely the bandwidth and the delay, of the identified links are known as they were exchanged when the association is setup at step 60. The link management module 34 then associates a send queue with each identified link. This send queue has a maximum length $S_{max}$ that is implementation dependant. The current length of the send queue for a link i is noted $S_i$.

Each time there is a new packet of size D to send at step 66, the link management module 34 evaluates, at step 68, the possibility of adding the packet to the send queue for the unidirectional link 24. If there is sufficient space for the packet in the unidirectional link queue, the packet is enqueued to be sent over the unidirectional link 24, at step 70. If the unidirectional link is saturated, the packet is sent over the bidirectional link 26, at step 72.

More particularly, at step 68, the following inequality (2) is evaluated:

$$S_{max} \geq S_i + D \qquad (2).$$

If this inequality holds, the packet is sent over the unidirectional link 24.

For packets to be sent on the bidirectional link 26, in the case where there are more than one bidirectional link, the general Westwood SCTP scheduling algorithm can be used.

For delay sensitive traffic, the scheduling needs to be done globally without separating the bidirectional link 26 and the unidirectional link 24.

In a typical implementation such as Westwood SCTP with Partial Reliability, generally noted W-SCTP-PR, the scheduler algorithm uses the following formula (3):

$$R_i = \text{MinRTT}_i/2 + (O_i + S_i + D)/B_i \qquad (3)$$

in which:
- $R_i$ is an estimated reception time for a link i;
- $\text{MinRTT}_i$ is the smallest round trip time seen on link i;
- $O_i$ is a current amount of outstanding, i.e. unacknowledged, data on the link i;
- $S_i$ is a current amount of buffered, i.e. not yet sent, data on the link i;
- D is an amount of data to be sent;
- $B_i$ is a current estimate of the link's capacity.

This algorithm estimates the arrival time of each packet to be sent, i.e. taking into account the delay. Links that have low capacity, a long round trip time or large amounts of data already in their buffers will yield a later arrival time.

The main drawback of most prior art techniques, such as the above W-SCTP-PR scheduling algorithm, is that they generally rely upon an uplink to accurately estimate the value of $B_i$ and min $\text{RTT}_i$.

In the present invention, these values, namely the bandwidth and the delay, are determined by an external means and communicated, at step 60, in the above control messages.

Thus, here, the above scheduling formula for W-SCTP-PR can be rewritten according to the following formula (4), for the unidirectional link 24:

$$R_i = \text{delay}_i + (O_i + S_i + D)/G_i \qquad (4)$$

in which:
- $\text{delay}_i$ is the delay indicated for the link i in the control message; and
- $G_i$ is the guaranteed bit rate over the link i indicated in the control message.

By comparing the scheduling values computed for the bidirectional link 26 and the unidirectional link 24, the SCTP transport stream manager 30 can efficiently dispatch the packets on both links while retaining the minimal delay property.

More particularly, for each packet, the value of $R_i$ is computed according to the formula (3) for each bidirectional link and according to the formula (4) for each unidirectional link. Then, all the values $R_i$ for all the links are compared in order to choose the smallest $R_i$. The packet will then be dispatched over the link i corresponding to this smallest $R_i$.

Finally, in the cases of the second and third variants of the bandwidth allocation, the content server 28 knows when the client 22 stops the SCTP session. Then, the content server 28 informs the transport stream manager 30 that frees the allocated bandwidth and updates the signaling.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed and/or claimed may be combined without departing from the scope of the invention.

Thus, even if the above description focused on one unidirectional and one bidirectional link, it can be advantageously applied to a hybrid network comprising a plurality of such links.

Besides, the described scheduling algorithms are only illustrations of the possibilities offered to the SCTP transport protocol once it has knowledge of the characteristics of the unidirectional links, according to the preferred embodiment of the present invention.

The invention claimed is:

1. A method of transmission of data to a client using a multihoming transport protocol, said method comprising:
   establishing a transport layer session with the client by transmitting, to the client, characteristics of a plurality of links with the client, the plurality of links comprising a unidirectional link broadcasting at least one transport stream and a bi-directional link, said characteristics comprising at least one of a flag indicating a nature of each link, said nature being chosen amongst bidirectional, send-only and receive-only;
   allocating bandwidth over the unidirectional link used to transmit data to the client;
   transmitting data to the client over the unidirectional link as long as said allocated bandwidth is not fully used; and
   if the allocated bandwidth has been fully used, transmitting remaining data to the client over the bi-directional link.

2. The method of claim 1, wherein the multihoming transport protocol is a Stream Control Transmission Protocol, SCTP, or an extension of SCTP.

3. The method of claim 1, wherein the characteristics are incorporated in a control message.

4. The method of claim 1, wherein said characteristics comprise, for each link, a delay for the transmission of data through the link.

5. The method of claim 4, wherein the flag is encoded over 4 bits, the bandwidth is encoded over 28 bits and the delay is encoded over 16 bits.

6. The method of claim 1, wherein the allocating of the bandwidth is carried out before establishing the session.

7. The method of claim 1, wherein the allocating of the bandwidth is carried out after establishing the session.

8. The method of claim 1, wherein the data comprises delay sensitive packets and non-delay sensitive packets, the delay sensitive packets are transmitted first and the non-delay sensitive packets are then transmitted over a remaining bandwidth in the unidirectional link and/or the bi-directional link.

9. An apparatus to transmit data to a client using a multihoming transport protocol, said apparatus comprising:
a memory;
at least one processor configured to:
transmit, to the client, characteristics of a plurality of links with the client so as to establish a transport layer session with the client, the plurality of links comprising a unidirectional link broadcasting at least one transport stream and a bi-directional link, said characteristics comprising, for each link, at least one of a flag indicating a nature of each link, said nature being chosen amongst bidirectional, send-only and receive-only;
allocate a bandwidth over the unidirectional link used to transmit data to the client;
transmit data to the client over the unidirectional link as long as said allocated bandwidth is not fully used; and
transmit remaining data to the client over the bi-directional link, if the allocated bandwidth has been fully used.

10. The apparatus of claim 9, wherein the multihoming transport protocol is a Stream Control Transmission Protocol, SCTP, or an extension of SCTP.

11. The apparatus of claim 9, wherein the characteristics are incorporated in a control message.

12. The apparatus of claim 9, wherein said characteristics comprise, for each interface, a delay for transmitting data through the interface.

13. The apparatus of claim 12, wherein the flag is encoded over 4 bits, the bandwidth is encoded over 28 bits and the delay is encoded over 16 bits.

14. The apparatus of claim 9, wherein the at least one processor is further configured to allocate the bandwidth before establishing the session.

15. The apparatus of claim 9, wherein the at least one processor is further configured to allocate the bandwidth after establishing the session.

16. The apparatus of claim 9, wherein the data comprises delay sensitive packets and non-delay sensitive packets, the delay sensitive packets are transmitted first and the non-delay sensitive packets are then transmitted over a remaining bandwidth in the unidirectional link and/or the bi-directional link.

17. An apparatus to receive data from a server using a multihoming transport protocol, said apparatus comprising:
a memory; and
at least one processor configured to:
transmit, to said server, characteristics of a plurality of links with the server so as to establish a transport layer session with the server, the plurality of links comprising a receive only link and a bi-directional link, said characteristics comprising, for each link at least a flag indicating a nature of each link with the server, the nature being chosen amongst bidirectional and receive only;
receive data from the server over the receive only link as long as a bandwidth is not fully used, said bandwidth being allocated by said server; and
receive remaining data from the server over the bi-directional link if the allocated bandwidth has been fully used.

18. A non-transitory computer-readable medium with instructions stored therein which, when executed, instruct at least one processor to:
transmit, to a client, characteristics of a plurality of links with the client to establish a transport layer session with the client, the plurality of links comprising a unidirectional link broadcasting at least one transport stream and a bi-directional link, said characteristics comprising, for each link, at least one of a flag indicating a nature of the link, said nature being chosen amongst bidirectional, send-only and receive-only;
allocate a bandwidth over the unidirectional link used to transmit data to the client;
transmit data to the client over the unidirectional link as long as said allocated bandwidth is not fully used; and
transmit data to the client over the bi-directional link, if the allocated bandwidth has been fully used.

19. A method to receive data from a server, said method comprising:
transmitting, to said server, characteristics of a plurality of links with the server so as to establish a transport layer session with the server, the plurality of links comprising a receive only link and a bi-directional link, said characteristics comprising, for each link at least a flag indicating a nature of each link with the server, the nature being chosen amongst bidirectional and receive only;
receiving data from the server over the receive only link as long as a bandwidth is not fully used, said bandwidth being allocated by said server; and
receiving remaining data from the server over the bi-directional link if the allocated bandwidth has been fully used.

20. A non-transitory computer readable medium with instructions stored therein which, when executed, instruct at least one processor to:
transmit to a server characteristics of a plurality of links with the server so as to establish a transport layer session with the server, the plurality of links comprising a receive only link and a bi-directional link, said characteristics comprising, for each link at least a flag indicating a nature of each link with the server, the nature being chosen amongst bidirectional and receive only;
receive data from the server over the receive only link as long as a bandwidth is not fully used, said bandwidth being allocated by said server; and
receive remaining data from the server over the bi-directional link if the allocated bandwidth has been fully used.

* * * * *